United States Patent
Kimura (10) Patent No.: US 10,770,995 B2
(45) Date of Patent: Sep. 8, 2020

(54) CLOSED CONTROL DEVICE FOR DC BRUSH MOTOR, CONTROL SYSTEM, AND CONTROL METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventor: Hideki Kimura, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/123,871

(22) Filed: Sep. 6, 2018

(65) Prior Publication Data
US 2019/0288622 A1    Sep. 19, 2019

(30) Foreign Application Priority Data
Mar. 16, 2018 (JP) .................... 2018-050130

(51) Int. Cl.
*G01R 31/34* (2020.01)
*H02P 7/24* (2006.01)
*H02P 7/282* (2016.01)

(52) U.S. Cl.
CPC ............ *H02P 7/245* (2013.01); *H02P 7/2825* (2013.01)

(58) Field of Classification Search
CPC .................. H02P 7/245; H02P 7/2825
See application file for complete search history.

(56) References Cited

U.S. PATENT DOCUMENTS

| | | | | |
|---|---|---|---|---|
| 2004/0228051 A1* | 11/2004 | Dragoi | ................... | H02H 7/093 361/23 |
| 2006/0017412 A1* | 1/2006 | Sasaya | ................... | H02P 7/0094 318/368 |
| 2007/0075660 A1* | 4/2007 | Moller | ...................... | H02P 5/68 318/400.04 |
| 2011/0148258 A1* | 6/2011 | Tanaka | ................... | H02K 23/66 310/68 B |
| 2014/0352995 A1* | 12/2014 | Matsunaga | ............... | B25F 5/00 173/179 |

FOREIGN PATENT DOCUMENTS

| | | |
|---|---|---|
| JP | 2005-261134 A | 9/2005 |
| JP | 2008-312416 A | 12/2008 |
| JP | 4434000 B2 | 3/2010 |
| JP | 2012-034513 A | 2/2012 |
| JP | 2017-184455 A | 10/2017 |

* cited by examiner

*Primary Examiner* — Muhammad S Islam
(74) *Attorney, Agent, or Firm* — White & Case LLP

(57) ABSTRACT

According to one embodiment, there is provided a control device including a detecting circuit, a control circuit and a drive circuit. The detecting circuit detects changes in a current flowing between a node and a smoothing circuit, the node being to which a DC brush motor, a power supply circuit and the smoothing circuit can be electrically connected via respective different lines. The control circuit generates a control signal to control rotation speed of the DC brush motor according to the detected changes in the current. The drive circuit drives the DC brush motor according to the control signal.

20 Claims, 8 Drawing Sheets

CLOSED CONTROL DEVICE FOR DC BRUSH MOTOR, CONTROL SYSTEM, AND CONTROL METHOD

CROSS-REFERENCE TO RELATED APPLICATIONS

This application is based upon and claims the benefit of priority from Japanese Patent Application No. 2018-050130, filed on Mar. 16, 2018; the entire contents of which are incorporated herein by reference.

FIELD

Embodiments described herein relate generally to a closed control device for a DC brush motor, a control system, and a control method.

BACKGROUND

A control device for a DC brush motor may control the rotation speed of the DC brush motor when driving the DC brush motor. In this case, it is desired to control the rotation speed appropriately.

DETAILED DESCRIPTION

In general, according to one embodiment, there is provided a control device including a detecting circuit, a control circuit and a drive circuit. The detecting circuit detects changes in a current flowing between a node and a smoothing circuit, the node being to which a DC brush motor, a power supply circuit and the smoothing circuit can be electrically connected via respective different lines. The control circuit generates a control signal to control rotation speed of the DC brush motor according to the detected changes in the current. The drive circuit drives the DC brush motor according to the control signal.

Exemplary embodiments of a control system will be explained below in detail with reference to the accompanying drawings. The present invention is not limited to the following embodiments.

The control system 1 according to the present embodiment is a system that controls a DC brush motor M. With the DC brush motor M, applied drive power and the rotation speed of the rotor RT obtained as the result thereof are not in a proportional relation. If, in order to control the rotation speed of the rotor RT, a detecting device such as an encoder may be provided near the DC brush motor M to detect the rotation speed. Because a size of the detecting device tends to be very large, the housing of the control system is likely to become larger correspondingly. Thus, the cost of the control system may increase. In consideration of this, the control system 1 may be constructed with a sensorless configuration (i.e., without providing the detecting device near the DC brush motor M) as exemplified in FIG. 1.

Figure 1:
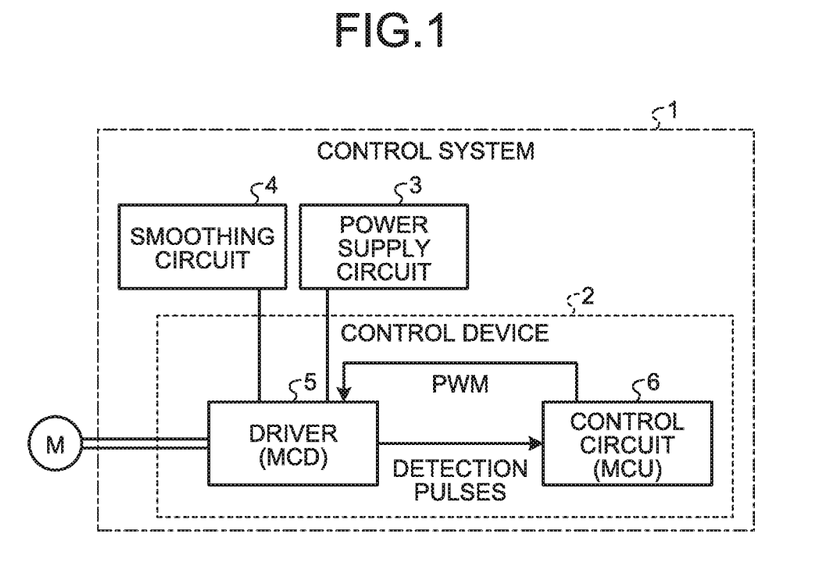
FIG. 1 is a diagram illustrating the configuration of a control system according to an embodiment.

FIG. 1 is a diagram illustrating the configuration of the control system 1 according to the present embodiment. The control system 1 performs drive control for a DC brush motor M and includes, for example, a control device 2, a power supply circuit 3, and a smoothing circuit 4. The control device 2 is connected to the power supply circuit 3, the smoothing circuit 4, and the DC brush motor M to control the drive of the DC brush motor M. The control device 2 includes a driver 5 and a control circuit 6. The driver 5 is incorporated as a motor coil driver (MCD). The control circuit 6 can be incorporated as a micro-controller unit (MCU).

Figure 2:
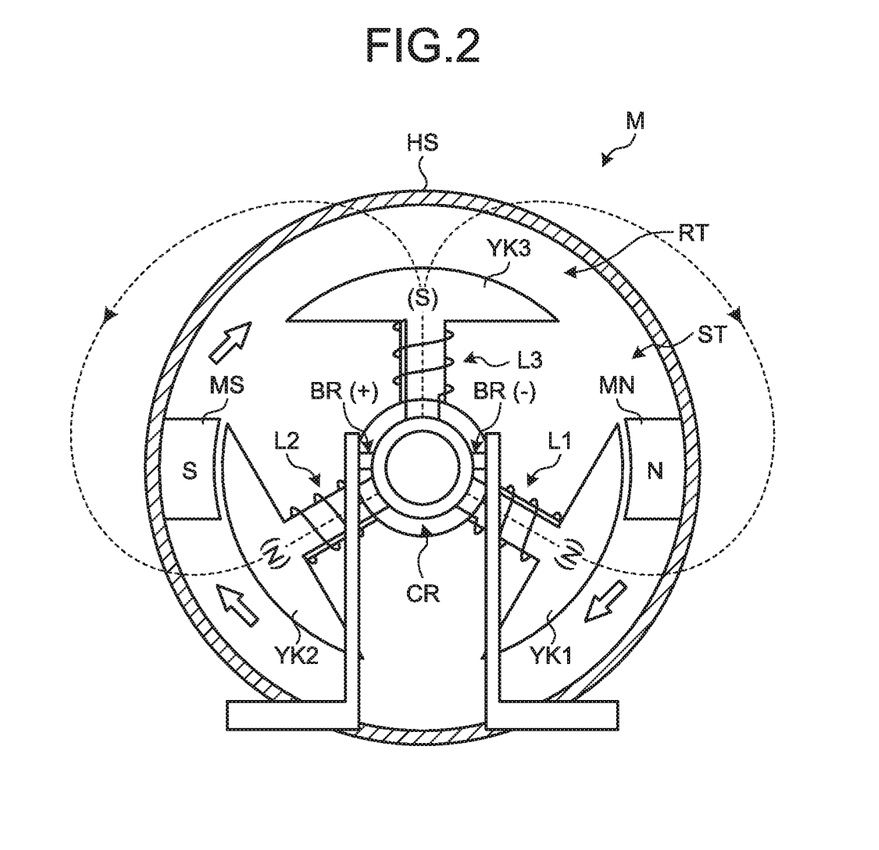
FIG. 2 is a diagram illustrating the configuration of a DC brush motor in the embodiment.

FIG. 2 is a diagram illustrating the configuration of the DC brush motor in the embodiment. The DC brush motor M includes a rotor RT and a stator ST and further includes brushes BR(+), BR(−) as a power supply mechanism for the rotor RT. The DC brush motor is relatively inexpensive in the production cost of the motor itself and relatively simple in structure, so that it can be used in very many fields.

The DC brush motor M differs from a stepping motor, a DC brushless motor, and an induction motor in that the brushes BR(+), BR(−) exist. The brushes BR(+), BR(−) supply power to the rotor RT actually rotating so as to cause the rotor RT to generate drive force as electromagnets and simultaneously causes it to continuously generate rotary torque by switching magnetic-field directions of the electromagnets according to the rotation of the rotor RT.

Figure 3:
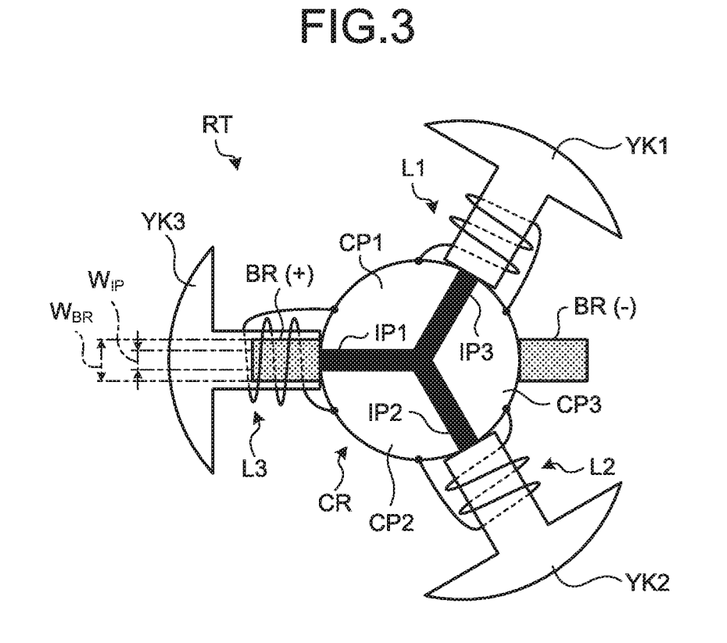
FIG. 3 is a diagram illustrating the configuration of a rotor and bushes in the embodiment.

For example, in FIG. 2, the stator ST has a permanent magnet MS of the south pole fixed on the left-side inner wall of a housing HS substantially in a cylinder shape and a permanent magnet MS of the north pole fixed on the right-side inner wall. FIG. 3 is a diagram illustrating the configuration of the RT. In the rotor RT of FIG. 3, multiple yokes YK1 to YK3 extend radially from a core CR whose outer surface touches the brushes BR(+), BR(−). A coil L1 to L3 is wound around each yoke YK1 to YK3. In the core CR, conductive parts and insulating parts are alternately placed in a circumferential direction. In the core CR of FIG. 3, a conductive part CP1, an insulating part IP1, a conductive part CP2, an insulating part IP2, a conductive part CP3, and an insulating part IP3 are placed sequentially along the circumferential direction. The case where, along the circumferential direction, the width $W_{BR}$ of the brushes BR(+), BR(−) is wider than the width $W_{IP}$ of the insulating parts IP1 to IP3 is illustrated.

A motor coil MC that can be formed of the coils electrically connected via the brushes BR(+), BR(−) generates a magnetic field according to power supplied via the brushes BR(+), BR(−) and generates magnetic interaction with the permanent magnets MS, MN. By this means, a turning force (rotary torque) indicated by open arrows in FIG. 2 is generated.

Because this mechanical rectifying mechanism is present, the DC brush motor M can cause the rotor RT to rotate by supplying power even without special control. In order to supply power to the DC brush motor M, in the control system 1, the power supply circuit 3 is connected to the control device 2.

The brushes BR(+), BR(−) touch the core CR, thereby achieving power supply. Thus, in the DC brush motor M, a noise (snap noise) due to mechanical rectification switching is likely to occur, and noise (brush noise) due to back electromotive voltage due to the reactance component of the motor coil MC is likely to occur. These noises affect EMI typified by radio noise or the like. In order to suppress this noise, in the control system 1, the smoothing circuit 4 is connected to the control device 2.

Further, one can think of a method 1 which detects a motor voltage by a voltage detector connected to opposite ends of the DC brush motor M so as to detect the rotation speed of the rotor RT without a sensor. One can think of a method 2 which detects a motor current by a current detector electrically inserted immediately before the rotor or the brush BR(+) or immediately after the brush BR(−) in the current path. However, when controlling the drive of the DC brush motor M, pulse width modulation (PWM) control is performed so as to make the pulse width of the drive voltage supplied to the brush BR(+) be variable, thereby controlling the rotation speed of the rotor RT. Hence, the other side touched by the brushes BR(+), BR(−) changes between a conductive part and an insulating part of the core CR, so that edge timings of the current waveform are likely to coincide with edge timings of the drive current due to the PWM control, and thus accuracy in detecting the rotation speed of the rotor RT is likely to decrease.

In the present embodiment, the control device 2 detects changes in the impedance in the DC brush motor M through detecting changes (polarity changes) in not the motor current but the current flowing between the control device 2 and the smoothing circuit 4, and by performing the PWM control with detection pulses indicating the detected changes in the current as triggers, accuracy in detecting the rotation speed of the rotor RT without a sensor is improved.

Figure 4:
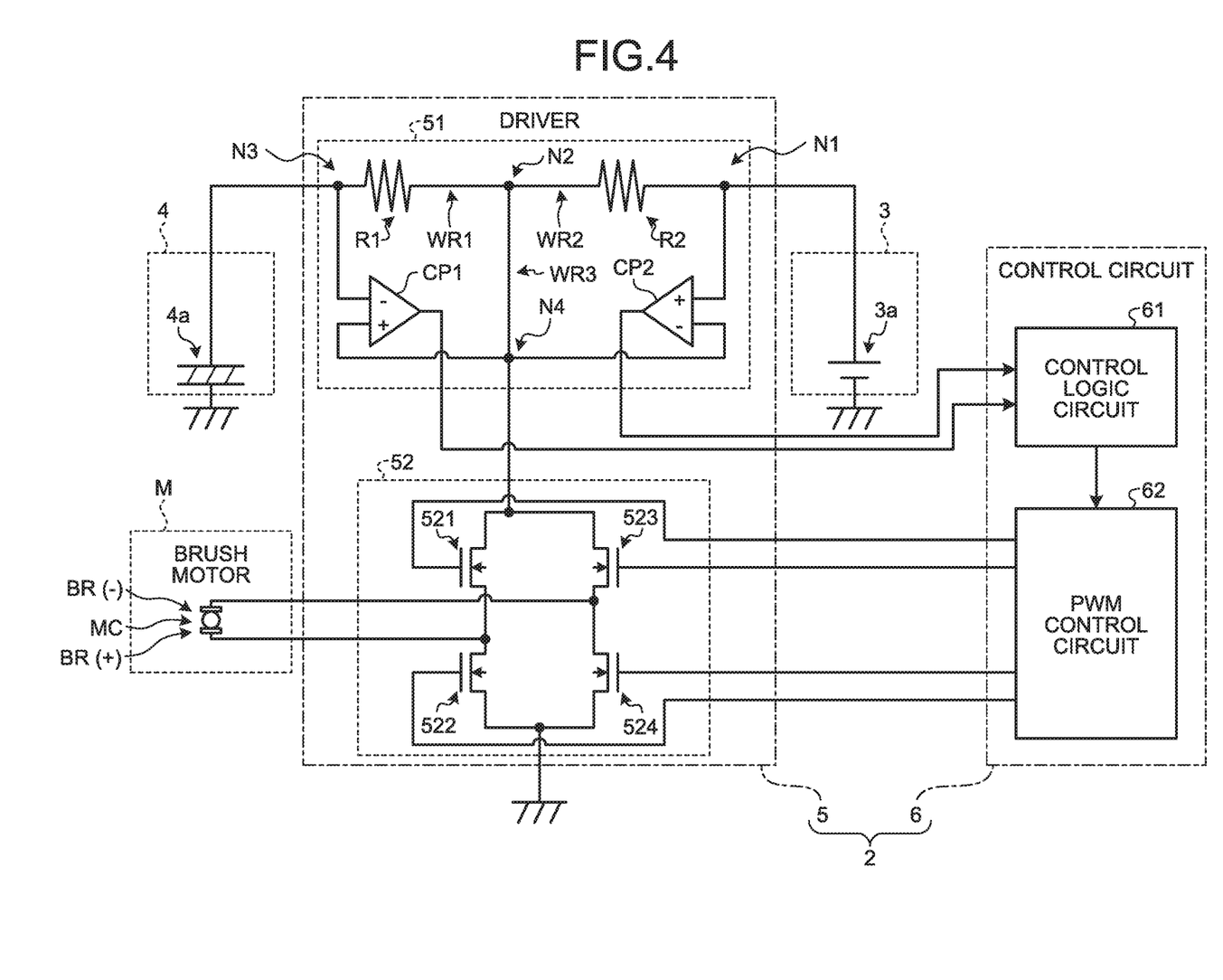
FIG. 4 is a diagram illustrating an example specific configuration of the control system in the embodiment.

FIG. 4 is a diagram illustrating an example specific configuration of the control system 1. The power supply circuit 3 includes a voltage source 3a. The smoothing circuit 4 includes a smoothing capacitor 4a. The driver 5 includes a detecting circuit 51 and a drive circuit 52. The control circuit 6 includes a control logic circuit 61 and a PWM control circuit 62.

The DC brush motor M, the power supply circuit 3, and the smoothing circuit 4 are electrically connected to a node N2 via respective different lines WR3, WR2, WR1. In this configuration, the detecting circuit 51 can detect changes in the polarity (orientation) of the current flowing between the node N2 and the smoothing circuit 4.

The detecting circuit 51 includes a resistance element R1, a resistance element R2, a comparator CP1, and a comparator CP2. The resistance element R1 has one end connected to the node N2 and the other end connected to a node N3. The comparator CP1 has its non-inverting input terminal (+) connected to a node N4 and via the line WR3 to the node N2, its inverting input terminal (−) connected to the node N3, and its output terminal connected to the control logic circuit 61. The comparator CP1 compares the potentials on the nodes N2 and N3 to output the comparing result as a detection pulse to the control logic circuit 61.

For example, if a current flows from the node N2 to the node N3, the potential on the node N3 is lower by the voltage drop across the resistance element R1 than the potential on the node N2. Thus, the comparator CP1 outputs a detection pulse of a high (H) level. If a current flows from the node N3 to the node N2, the potential on the node N2 is lower by the voltage drop across the resistance element R1 than the potential on the node N3. Thus, the comparator CP1 outputs a detection pulse of a low (L) level.

The resistance element R2 has one end connected to a node N1 and the other end connected to the node N2. The comparator CP2 has its non-inverting input terminal (+) connected to the node N1, its inverting input terminal (−) connected to the node N4 and via the line WR3 to the node N2, and its output terminal connected to the control logic circuit 61. The comparator CP1 compares the potentials on the nodes N2 and N3 to output the comparing result as a detection pulse to the control logic circuit 61.

For example, if a current flows from the node N1 to the node N2, the potential on the node N2 is lower by the voltage drop across the resistance element R2 than the potential on the node N1. Thus, the comparator CP2 outputs a detection pulse of the H level. If a current flows from the node N2 to the node N1, the potential on the node N1 is lower by the voltage drop across the resistance element R2 than the potential on the node N2. Thus, the comparator CP2 outputs a detection pulse of the L level.

The control logic circuit 61 generates a speed signal indicating the rotation speed of the rotor RT with the detection pulses outputted from the comparators CP1, CP2 as triggers. For example, the control logic circuit 61 counts the number of clocks from an edge timing to the next edge timing of detection pulses by a counter or the like to generate a speed signal according to the count value and to output to the PWM control circuit 62.

The PWM control circuit 62 obtains the amount of correction (by which to be accelerated or decelerated) for the rotation speed of the rotor RT according to the deviation between the speed indicated by the speed signal and a target speed so as to make the deviation closer to zero and generates a PWM control signal to control the rotation side of the rotor RT according to the amount of correction. The PWM control circuit 62 supplies the PWM control signal to the drive circuit 52.

The drive circuit 52 can be configured as an H bridge circuit and includes transistors 521 to 524. Each transistor 521 to 524 has its gate connected to the PWM control circuit 62 and can be constituted by an NMOS transistor. The transistor 521 has its drain connected to the node N2 via the node N4 and the line WR3 and its source connected to the brush BR(+). The transistor 522 has its drain connected to the brush BR(+) and its source connected to ground potential. The transistor 523 has its drain connected to the node N2 via the node N4 and the line WR3 and its source connected to the brush BR(−). The transistor 524 has its drain connected to the brush BR(−) and its source connected to ground potential.

Figure 5A:
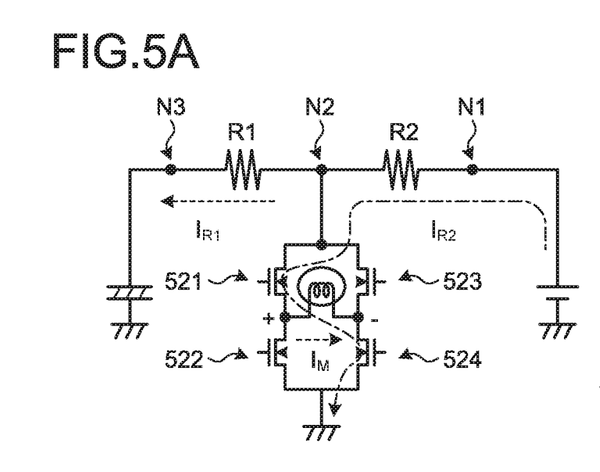
FIGS. 5A to 5F are diagrams illustrating the operation of the control system according to the embodiment.
Figure 5B:
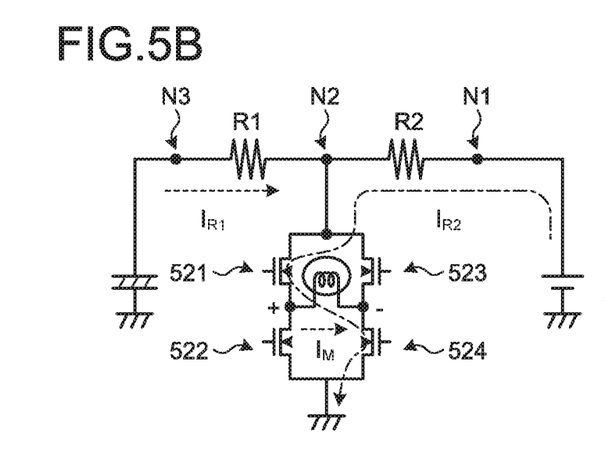
Figure 5C:
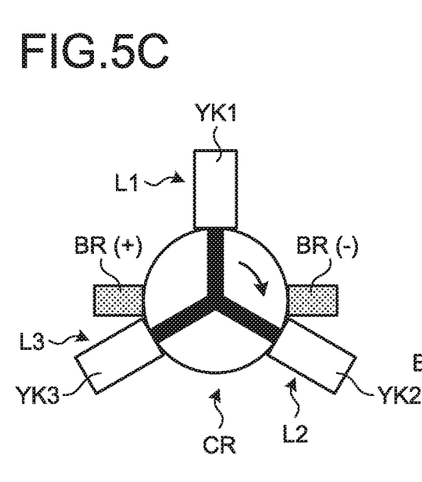
Figure 5D:
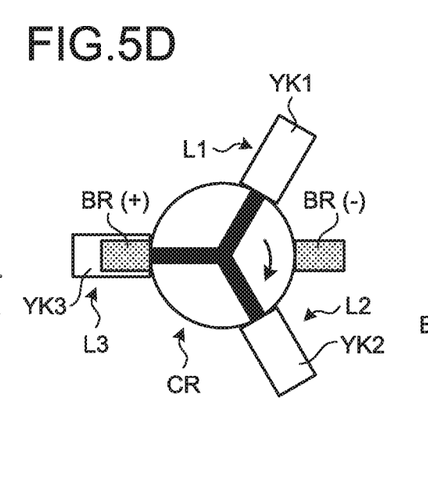
Figure 5E:
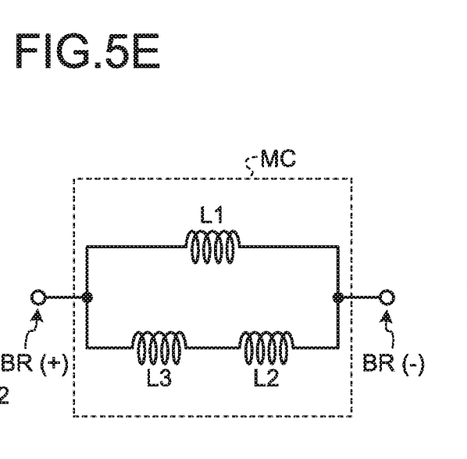
Figure 5F:
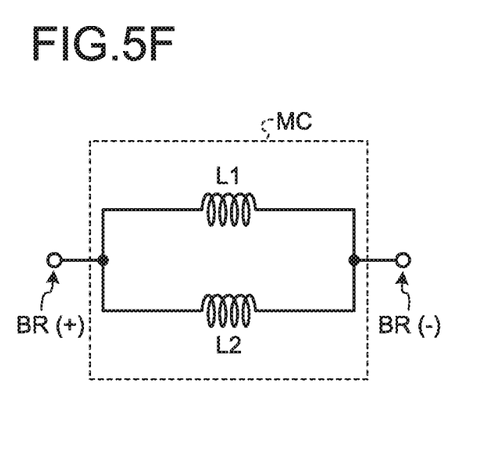

FIGS. 5A to 5F are diagrams illustrating the operation of the control system 1. For example, when making the rotor RT rotate, the transistors 521, 524 are turned on, and the transistors 522, 523 are turned off. FIGS. 5A, 5B illustrate the polarities (orientations) of the currents flowing through the resistance elements R1, R2; FIGS. 5C, 5D illustrate the rotational position of the rotor RT; and FIGS. 5E, 5F show equivalent circuit diagrams for what is between the brushes BR(+), BR(−).

If the rotational position of the rotor RT is the position shown in FIG. 5C (at which time both the brushes BR(+), BR(−) touch conductive parts of the core CR), the equivalent circuit for what is between the brushes BR(+), BR(−) is as shown in FIG. 5E. That is, the inside of the motor coil MC becomes a parallel connection of the coil L1 and a series connection of the coils L3 and L2, so that the impedance of the motor coil MC becomes a relatively high impedance Z1. Thus, as shown in FIG. 5A, a current $I_{R2}$ from the node N1 to the node N2 flows through the resistance element R2, and a current $I_{R1}$ from the node N2 to the node N3 flows through the resistance element R1.

If the rotational position of the rotor RT is the position shown in FIG. 5D (at which time either of the brushes BR(+), BR(−) touches an insulating part of the core CR), the equivalent circuit for what is between the brushes BR(+), BR(−) is as shown in FIG. 5F. That is, the inside of the motor coil MC becomes a parallel connection of the coils L1 and L2, so that the impedance of the motor coil MC becomes a relatively low impedance Z2. Thus, as shown in FIG. 5B, a current $I_{R2}$ from the node N1 to the node N2 flows through the resistance element R2, and a current $I_{R1}$ from the node N3 to the node N2 flows through the resistance element R1.

Figure 6A:
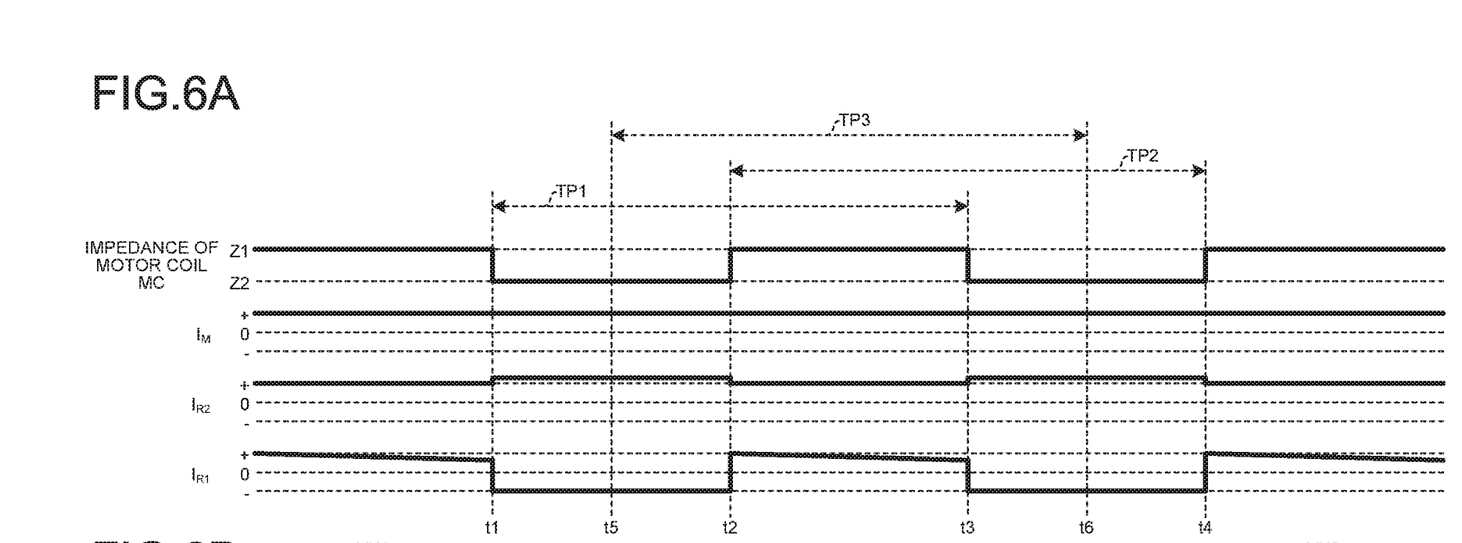
FIGS. 6A to 6C are diagrams illustrating the operation of the control system according to the embodiment.
Figures 6B, 6C:
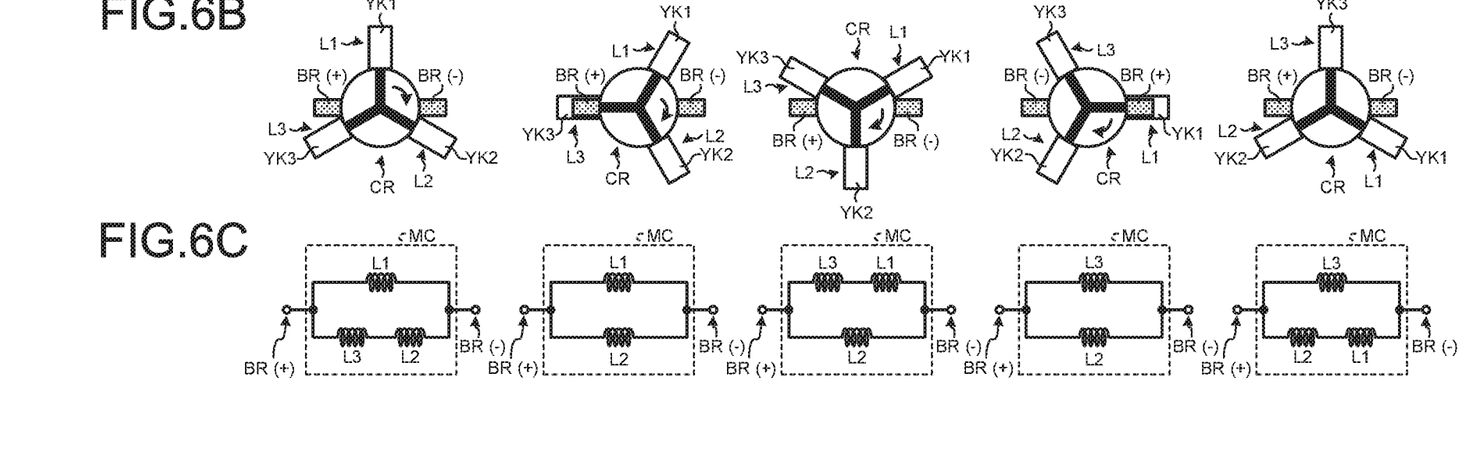

This operation is denoted in a time series in FIGS. 6A to 6C. FIGS. 6A to 6C are diagrams illustrating the operation of the control system 1. FIG. 6A shows a waveform chart of the impedance of the motor coil MC, the motor current $I_M$, the current $I_{R2}$, and the current $I_{R1}$; FIG. 6B illustrates the rotational position of the rotor RT; and FIG. 6C shows equivalent circuit diagrams for what is between the brushes BR(+), BR(−). In FIG. 6A, as to the current $I_{R2}$, the orientation from the node N1 to the node N2 (with which the output of the comparator CP2 is at the H level) is indicated by "+", and the orientation from the node N2 to the node N1 (with which the output of the comparator CP2 is at the L level) is indicated by "−". As to the current $I_{R1}$, the orientation from the node N2 to the node N3 (with which the output of the comparator CP1 is at the H level) is indicated by "+", and the orientation from the node N3 to the node N2 (with which the output of the comparator CP2 is at the L level) is indicated by "−".

When at timings t1, t3 shown in FIG. 6A the current $I_{R1}$ changes from "+" to "−", the control logic circuit 61 realizes that a detection pulse from the comparator CP1 switches from the H level to the L level. When at timings t2, t4 the current $I_{R1}$ changes from "−" to "+", the control logic circuit 61 realizes that a detection pulse from the comparator CP1 switches from the L level to the H level.

At this time, the control logic circuit 61 can generate the speed signal with the time period TP1 from timing t1 to t3 being ⅓ of the period of the rotation of the rotor RT. For example, the control logic circuit 61 counts the number of clocks from a falling edge to the next falling edge timing of detection pulses by a counter or the like to generate the value of three times the count value as the speed signal (a signal indicating the time length per period).

Or the control logic circuit 61 can generate the speed signal with the time period TP2 from timing t2 to t4 being ⅓ of the period of the rotation of the rotor RT. For example, the control logic circuit 61 counts the number of clocks from a rising edge to the next rising edge timing of detection pulses by a counter or the like to generate the value of three times the count value as the speed signal (a signal indicating the time length per period).

Or the control logic circuit 61 can generate the speed signal with the time period TP3 from timing t5 to t6 being ⅓ of the period of the rotation of the rotor RT. Timing t5 is the middle timing between timing t1 and timing t2. Timing t6 is the middle timing between timing t3 and timing t4. For example, the control logic circuit 61 counts the number of clocks from the middle timing between falling and rising edges to the middle timing between the next falling and rising edges of detection pulses by a counter or the like to generate the value of three times the count value as the speed signal (a signal indicating the time length per period).

As such, in the embodiment, the control device 2 detects changes in the impedance in the DC brush motor M through detecting changes (polarity changes) in the current $I_{R1}$ flowing between the control device 2 and the smoothing circuit 4 and performs the PWM control with detection pulses indicating the detected changes in the current as triggers. That is, in parallel with drive operation of the DC brush motor M by the PWM control, the rotation speed of the rotor RT in the DC brush motor M can be detected through detecting changes (polarity changes) in the current $I_{R1}$ that is hardly affected by the PWM control. Thus, accuracy in detecting the rotation speed of the rotor RT without a sensor can be easily improved, and the rotation speed of the rotor RT can be PWM controlled appropriately. That is, the rotation speed of the DC brush motor M can be controlled appropriately.

Figure 7:
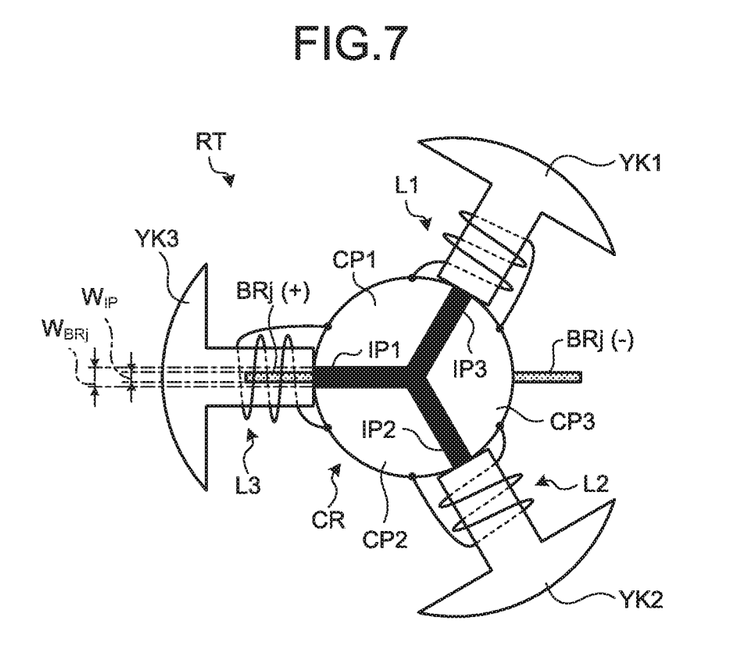
FIG. 7 is a diagram illustrating the configuration of a rotor and brushes in a modified example of the embodiment.

Although the embodiment illustrates the configuration of the DC brush motor M where along the circumferential direction the width $W_{BR}$ of the brushes BR(+), BR(−) is wider than the width $W_{IP}$ of the insulating parts IP1 to IP3, the concept of the present embodiment can also be applied to the configuration of the DC brush motor M where along the circumferential direction the width $W_{BRj}$ of brushes BRj (+), BRj (−) is narrower than the width $W_{IP}$ of the insulating parts IP1 to IP3. FIG. 7 is a diagram illustrating the configuration of the rotor RT and brushes BRj(+), BRj(−) in a modified example of the embodiment.

Figure 8A:
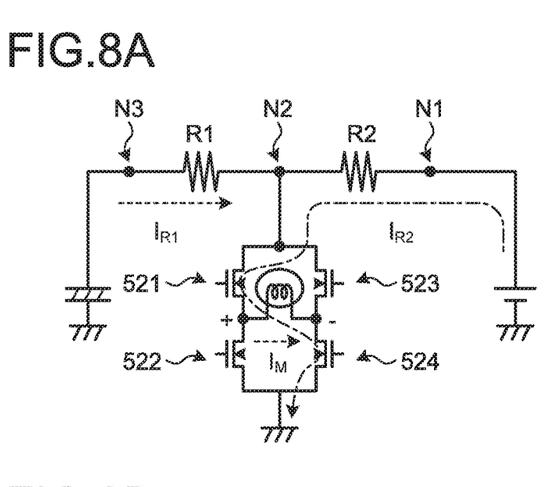
FIGS. 8A to 8F are diagrams illustrating the operation of a control system according to the modified example of the embodiment.
Figure 8B:
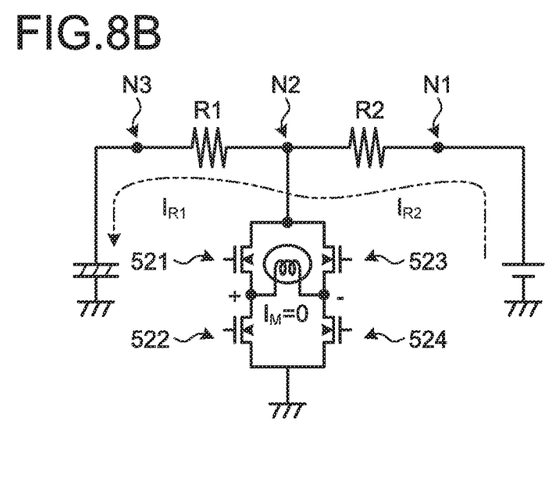
Figure 8C:
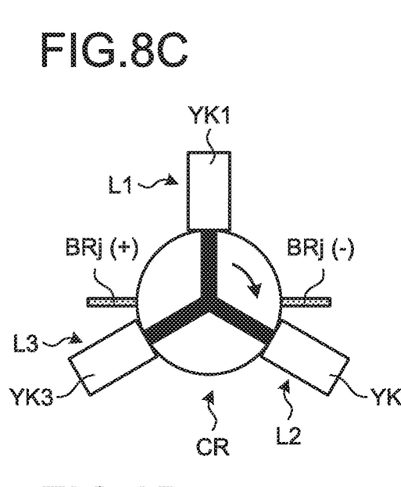
Figure 8D:
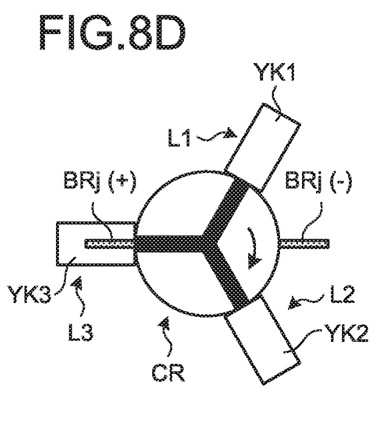
Figure 8E:
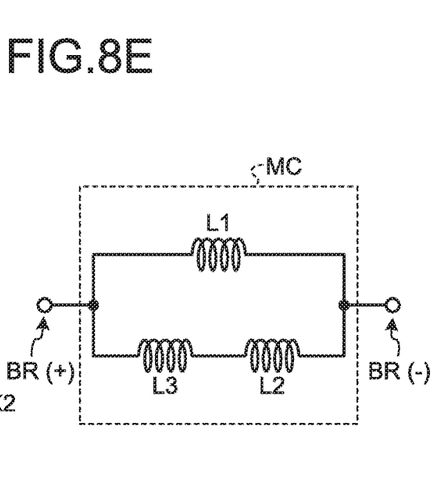
Figure 8F:
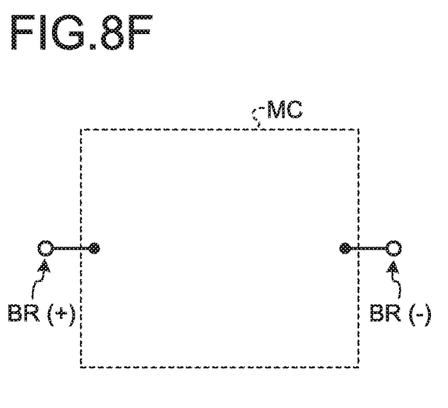

FIGS. 8A to 8F are diagrams illustrating the operation of the control system 1 according to the modified example of the embodiment. For example, when making the rotor RT rotate, the transistors 521, 524 are turned on, and the transistors 522, 523 are turned off. FIGS. 8A, 8B illustrate the polarities (orientations) of the currents flowing through the resistance elements R1, R2; FIGS. 8C, 8D illustrate the rotational position of the rotor RT; and FIGS. 8E, 8F show equivalent circuit diagrams for what is between the brushes BRj(+), BRj(−).

If the rotational position of the rotor RT is the position shown in FIG. 8C (at which time both the brushes BRj (+), BRj(−) touch conductive parts of the core CR), the equivalent circuit for what is between the brushes BRj(+), BRj(−) is as shown in FIG. 8E. That is, the inside of the motor coil MC becomes a parallel connection of the coil L1 and a series connection of the coils L3 and L2, so that the impedance of the motor coil MC becomes an impedance Z1. Thus, as shown in FIG. 8A, a current $I_{R2}$ from the node N1 to the node N2 flows through the resistance element R2, and a current $I_{R1}$ from the node N3 to the node N2 flows through the resistance element R1.

If the rotational position of the rotor RT is the position shown in FIG. 8D (at which time either of the brushes BRj(+), BRj(−) touches an insulating part of the core CR), the equivalent circuit for what is between the brushes BR(+), BR(−) is as shown in FIG. 8F. That is, the inside of the motor coil MC goes into an open state (insulating state), so that the impedance of the motor coil MC becomes ∞ (infinite). Thus, as shown in FIG. 8B, a current $I_{R2}$ from the node N1 to the node N2 flows through the resistance element R2, and a current $I_{R1}$ from the node N2 to the node N3 flows through the resistance element R1.

Figure 9A:
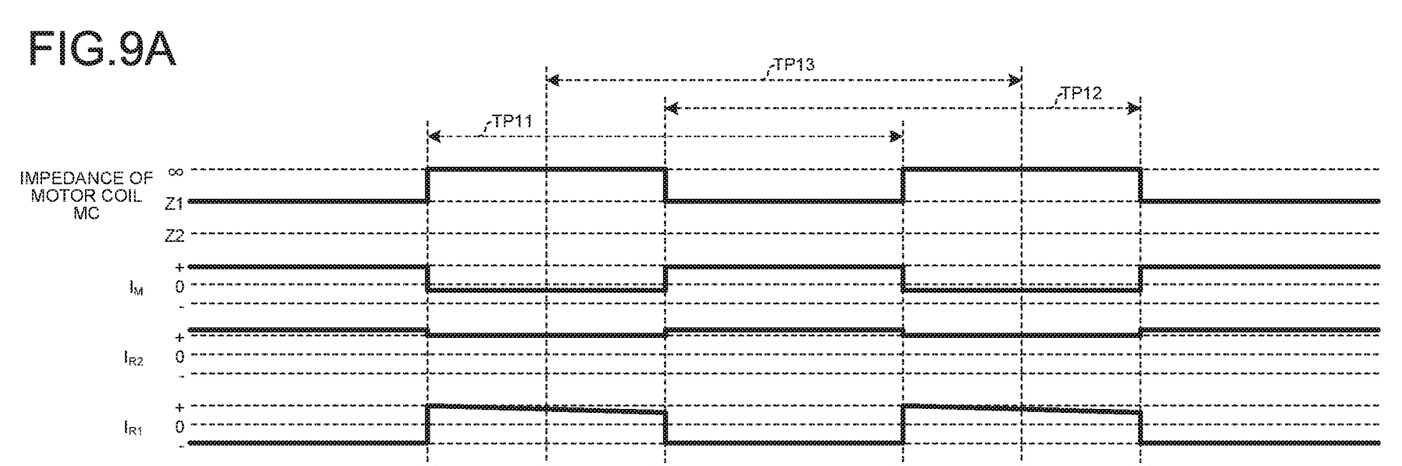
FIGS. 9A to 9C are diagrams illustrating the operation of the control system according to the modified example of the embodiment.
Figure 9B:
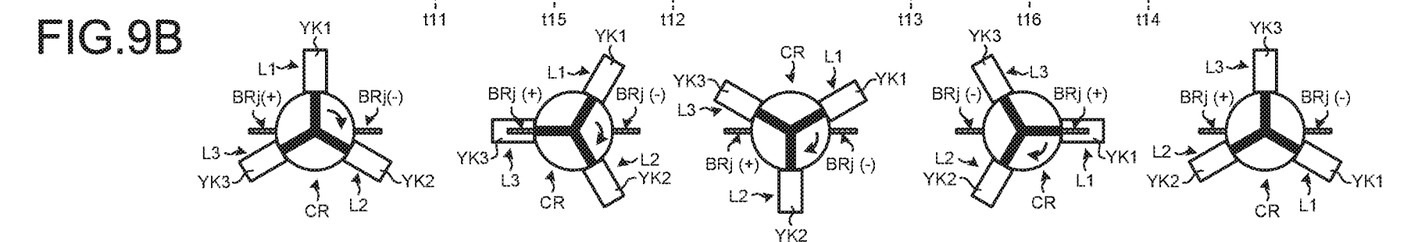
Figure 9C:
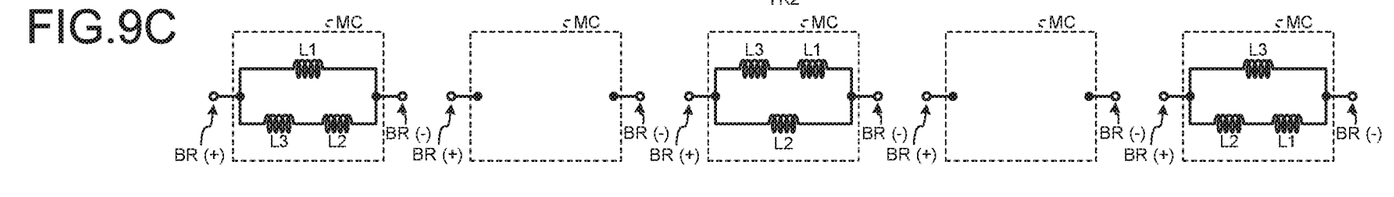

This operation is denoted in a time series in FIGS. 9A to 9C. FIGS. 9A to 9C are diagrams illustrating the operation of the control system 1. FIG. 9A is a waveform chart of the impedance of the motor coil MC, the motor current $I_M$, the current $I_{R2}$ flowing through the resistance element R2, and the current $I_{R1}$ flowing through the resistance element R1; FIG. 9B illustrates the rotational position of the rotor RT; and FIG. 9C illustrates equivalent circuit diagrams for what is between the brushes BRj(+), BRj(−). In FIG. 9A, as to the current $I_{R2}$, the orientation from the node N1 to the node N2 (with which the output of the comparator CP2 is at the H level) is indicated by "+", and the orientation from the node N2 to the node N1 (with which the output of the comparator CP2 is at the L level) is indicated by "−". As to the current $I_{R1}$, the orientation from the node N2 to the node N3 (with which the output of the comparator CP1 is at the H level) is indicated by "+", and the orientation from the node N3 to the node N2 (with which the output of the comparator CP2 is at the L level) is indicated by "−"

When at timings t11, t13 shown in FIG. 9A the current $I_{R1}$ changes from "−" to "+", the control logic circuit 61 realizes that a detection pulse from the comparator CP1 switches from the L level to the H level. When at timings t12, t14 the current $I_{R1}$ changes from "+" to "−", the control logic circuit 61 realizes that a detection pulse from the comparator CP1 switches from the H level to the L level.

At this time, the control logic circuit 61 can generate the speed signal with the time period TP11 (timing t11 to t13), the time period TP12 (timing t12 to t14), or the time period TP13 (timing t15 to t16) being ⅓ of the period of the rotation of the rotor RT. Timing t15 is the middle timing between timing t11 and timing t12. Timing t16 is the middle timing between timing t13 and timing t14. For example, the control logic circuit 61 counts the number of clocks in the period by a counter or the like to generate the value of three times the count value as the speed signal.

Also with this configuration and operation, in parallel with drive operation of the DC brush motor M by the PWM control, the rotation speed of the rotor RT in the DC brush motor M can be detected through detecting changes (polarity changes) in the current $I_{R1}$ that is hardly affected by the PWM control. Thus, accuracy in detecting the rotation speed of the rotor RT without a sensor can be easily improved, and the rotation speed of the rotor RT can be PWM controlled appropriately. That is, the rotation speed of the DC brush motor M can be controlled appropriately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device comprising:
    a drive circuit, one end of the drive circuit being electrically connected to a DC brush motor;
    a detecting circuit that includes a node connectable to each of another end of the drive circuit, one end of a power supply circuit, and to one end of a smoothing circuit, and that detects changes in a current flowing between the node and the smoothing circuit; and
    a control circuit that generates a control signal to control rotation speed of the DC brush motor according to the detected changes in the current,
    the drive circuit driving the DC brush motor according to the generated control signal.

2. The control device according to claim 1, wherein
    the detecting circuit detects changes in polarity of the current, and
    wherein the control circuit generates a control signal to control rotation speed of the DC brush motor according to the detected changes in polarity of the current.

3. The control device according to claim 2, wherein
    the control circuit obtains the time from a first timing at which to detect a change in polarity of the current to a second timing at which to detect a change in polarity of the current after the first timing and generates a control signal to control rotation speed of the DC brush motor according to the time.

4. The control device according to claim 3, wherein
    the control circuit includes:
    a counter that counts the number of clocks from the first timing to the second timing; and
    a logic circuit that generates a speed signal indicating the rotation speed of the DC brush motor according to the counted number of clocks.

5. The control device according to claim 4, wherein
    the logic circuit multiplies the counted number of clocks by an integer to generate the speed signal.

6. The control device according to claim 5, wherein
    the DC brush motor includes a rotor having an equal number of insulating parts to the integer arranged along a circumferential direction.

7. The control device according to claim 6, wherein
    the DC brush motor further includes a plurality of brushes,
    wherein the width of the brushes along the circumferential direction is wider than the width of the insulating parts along the circumferential direction, and
    wherein an impedance between the brushes is lower during the period when the brush touches the insulating part than during the period when the brush does not touch the insulating part.

8. The control device according to claim 6, wherein
    the DC brush motor further includes a plurality of brushes,
    wherein the width of the brushes along the circumferential direction is narrower than the width of the insulating parts along the circumferential direction, and
    wherein an impedance between the brushes is higher during the period when the brush touches the insulating part than during the period when the brush does not touch the insulating part.

9. The control device according to claim 1, wherein
    the detecting circuit detects changes in polarity of the current in parallel with operation of the drive circuit driving the DC brush motor.

10. The control device according to claim 9, wherein
    the control circuit obtains the time from a first timing at which to detect a change in polarity of the current to a second timing at which to detect a change in polarity of the current after the first timing and generates a control signal to control rotation speed of the DC brush motor according to the time.

11. The control device according to claim 10, wherein
    the control circuit includes:
    a counter that counts the number of clocks from the first timing to the second timing; and
    a logic circuit that generates a speed signal indicating the rotation speed of the DC brush motor according to the counted number of clocks.

12. The control device according to claim 11, wherein the drive circuit drives the DC brush motor according to the deviation between the speed indicated by the speed signal and a target speed.

13. The control device according to claim 1, wherein the detecting circuit includes:
a first resistance element having one end connected to the node and the other end connected to the smoothing circuit; and
a first comparator having a first input terminal connected to one end of the first resistance element and a second input terminal connected to the other end of the first resistance element.

14. The control device according to claim 13, wherein the control circuit obtains the time from a first timing at which the output of the first comparator changes to a second timing at which the output of the first comparator changes after the first timing and generates a control signal to control rotation speed of the DC brush motor according to the time.

15. The control device according to claim 14, wherein the control circuit includes:
a counter that counts the number of clocks from the first timing to the second timing; and
a logic circuit that generates a speed signal indicating the rotation speed of the DC brush motor according to the counted number of clocks.

16. The control device according to claim 13, wherein the detecting circuit includes:
a second resistance element having one end connected to the node and the other end connected to the power supply circuit; and
a second comparator having a first input terminal connected to one end of the second resistance element and a second input terminal connected to the other end of the second resistance element.

17. A control system comprising:
a power supply circuit;
a smoothing circuit; and
a control device placed between the power supply circuit and a DC brush motor and between the smoothing circuit and the DC brush motor,
wherein the control device includes:
a drive circuit, one end of the drive circuit being electrically connected to the DC brush motor;
a detecting circuit that includes a node connectable to each of another end of the drive circuit, one end of a power supply circuit, and one end of a smoothing circuit, and that detects changes in a current flowing between the node and the smoothing circuit; and
a control circuit that generates a control signal to control rotation speed of the DC brush motor according to the detected changes in the current,
the drive circuit driving the DC brush motor according to the generated control signal.

18. The control system according to claim 17, wherein the detecting circuit detects changes in polarity of the current, and
wherein the control circuit generates a control signal to control rotation speed of the DC brush motor according to the detected changes in polarity of the current.

19. A control method comprising:
detecting, by a detecting circuit that includes a node connectable to each of one end of a drive circuit of a DC brush motor, one end of a power supply circuit, and one end of a smoothing circuit, changes in a current flowing between the node and the smoothing circuit;
generating a control signal to control rotation speed of the DC brush motor according to the detected changes in the current; and
driving by the drive circuit the DC brush motor according to the control signal.

20. The control method according to claim 19, wherein the detecting includes detecting changes in polarity of the current, and
wherein the generating includes generating a control signal to control rotation speed of the DC brush motor according to the detected changes in polarity of the current.

* * * * *